United States Patent [19]
Kim et al.

[11] Patent Number: 6,052,822
[45] Date of Patent: Apr. 18, 2000

[54] FAST DESTAGING METHOD USING PARITY ENGINE

[75] Inventors: Jin Pyo Kim; Joong Bae Kim; Yong Yeon Kim; Suk Han Yoon, all of Dejon-Shi, Rep. of Korea

[73] Assignee: Electronics and Telecommunications Research Institute, Daejon, Rep. of Korea

[21] Appl. No.: 09/141,094

[22] Filed: Aug. 26, 1998

[30] Foreign Application Priority Data

Dec. 22, 1997 [KR] Rep. of Korea ............... 97-72066

[51] Int. Cl.⁷ .................................. H03M 13/00
[52] U.S. Cl. .................... 714/805; 714/6; 714/799; 714/800
[58] Field of Search .............. 714/6, 805, 799, 714/800

[56] References Cited

U.S. PATENT DOCUMENTS

| | | | |
|---|---|---|---|
| 5,485,598 | 1/1996 | Kashima et al. | 395/182.04 |
| 5,634,109 | 5/1997 | Chen et al. | 395/470 |
| 5,754,888 | 5/1998 | Yang et al. | 395/872 |
| 5,765,183 | 6/1998 | Kojima et al. | 714/805 |

OTHER PUBLICATIONS

Anujan Varma et al., "Destaging Algorithms for Disk Arrays With Non–Volatile Caches", 1995, pp. 183–95.
Jai Menon et al., "The Architecture of a Fault–Tolerant Cached RAID Controller", 1993, pp. 76–86.

*Primary Examiner*—Phung M. Chung
*Attorney, Agent, or Firm*—Cohen, Pontani, Lieberman & Pavane

[57] ABSTRACT

The present invention relates to the fast destaging method using a parity engine, and more particularly to the fast destaging method for constituting and administering the cache of disk array in order to minimize lowering of write performance which occurs in high-speed disk array controller using VRAM parity engine.

According to the invention, the disk cache is composed of the read cache, the write cache and the destaging cache. The write caching is processed as being divided into the write cache and the destaging cache. The destaging cache, which has just one more block for mid parity to its data block, uses less memory and enables the write cache to be allocated with more blocks, and thereby it can improve hit ratio of cache. Write requests are first stored on the write cache, and if the write cache is full, they move blocks that would be least used thereafter into the destaging cache. Once destaging is requested, it is practicable with one parity calculation and two write operations by selecting blocks that is least recently used.

Also in destaging, block parity calculation can increase its speed and relieve the processor burden by using a VRAM based parity engine which has its dual ports.

3 Claims, 5 Drawing Sheets

FAST DESTAGING METHOD USING PARITY ENGINE

BACKGROUND OF THE INVENTION

1. Field of the Invention

The present invention relates to the fast destaging method using a parity engine, and more particularly to the fast destaging method for constituting and administering cache of the disk array in order to minimize degradation of write performance which occurs in the high-speed disk array controller using a VRAM parity engine.

2. Description of the Related Prior Art

Generally, the disk array system is of high performance and of large capacity, which distributes and accommodates data into a plurality of independent disks to operate as a big disk. However, viewing that in the disk array system data are distributed and accommodated into many disks, only one disk failure can cause the whole system data to get damaged and unable to be retrieved. To overcome this problem, RAID system provides recovery method of damaged data by utilizing secondary data such as Disk Mirroring or ECC code or parity data. According to their features and manuals of those secondary data, the system is to be classified into multiple RAID levels, and RAID level 5, which disperses and accommodates parity data into multiple disks, is frequently used.

The disk array system operating in RAID level 5 is extensively used as a large storage device which achieves high availability through parity storage and high I/O rate through a block interleaving. In spite of a disk failure, the parity block for the whole data block always should be calculated and stored so as to retrieve the disk data. Therefore, at each write request additional three disk I/O are required, which gracefully degrades write performance.

If the loads of disk I/O increase, the number of I/O to limited disks gracefully increases, which degrades write performance and the overall disk I/O performance.

To minimize the performance degradation by write operations in a RAID level 5 disk array, the delayed writes technique is used. The delayed writes technique cannot reduce the number of disk I/O without increasing hit ratio of the write cache. However, the host system using a disk array also involves a buffer cache in its operating system and thereby it is hard to expect high hit ratio of cache. In case that cache miss occurs and no new block is available to allocate to the write cache, one of the blocks resident in cache should be written onto the disk and evacuated, which is termed destaging. Destaging consists of three operations at large. Firstly, to calculate a new parity block, the old data block is to be read from the data disk and the old parity block is to be read from the parity disk. Secondly, a new parity block is obtained by exclusive OR'ing(XOR'ing) the destaging block and the old data and the old parity block. Finally, when parity operation terminates, the destaging block and the new parity block are stored in a disk, and subsequently the destaging block is removed from the cache, and then destaging operation is terminated. If cache miss frequently occurs, it is necessarily needed to reduce destaging number and destaging time in order to avoid degradation of performance.

FIG. 1 shows the architecture of former disk array 1 which has the disk cache 3, the old data cache 4, the old parity cache 5, exclusive OR 2 and a plurality of disks. In the disk array controller which utilizes the former write cache, two reads and two writes are generated in the data disk and the parity disk at destaging, and thereby the performance greatly degrades even with a slightly increase of write miss ratio. In order to relieve the burden of reading the old data and the old parity for destaging, the method was also proposed that two reads can be reduced at destaging by installing extra cache for the old data and the old parity. The method has its drawbacks in that the cost is high due to extra cache and in that cache block is diminished enough to drop hit ratio of cache in the case of dividing the limited cache capacity into three parts.

SUMMARY OF THE INVENTION

Therefore, it is an object of the present invention to provide fast destaging method using a parity engine which minimizes the performance degradation due to destaging by utilizing a disk cache as a read cache, a write cache and a destaging cache.

To accomplish the foregoing object, this invention comprises the steps of: inspecting the read cache after arrival of a read request from the host system; returning the related block from the read cache if the requested block is resident in the read cache, and if not, returning the related block after reading back through the read cache from a disk; inspecting first the write cache and the destaging cache when a write request entered, and writing the data received from the host onto the block if resident in cache, and if not, inspecting whether or not there is any block available to allocate to the write cache and writing the data received from the host onto the available block; moving the block of the write cache into the destaging cache and evacuating the destaging cache if no block is available to allocate to the write cache; reading back the old data and the old parity to get the mid parity calculated, as the block moved into the destaging cache is an object of destaging; generating destaging when there is no room to allocate to the destaging cache, and processing one parity calculation and two writes, and calculating the new parity; writing an updated data and a new parity block into each data disk and parity disk.

BRIEF DESCRIPTION OF DRAWINGS

For fuller understanding of the nature and object of the invention, reference should be had to the following detailed description taken in conjunction with the accompanying drawings in which.

Similar reference characters refer to similar parts in the several views of the drawings.

DESCRIPTION OF THE PREFERRED EMBODIMENT

The present invention is to be explained specifically hereinafter with reference to the attached drawings.

Figure 1:
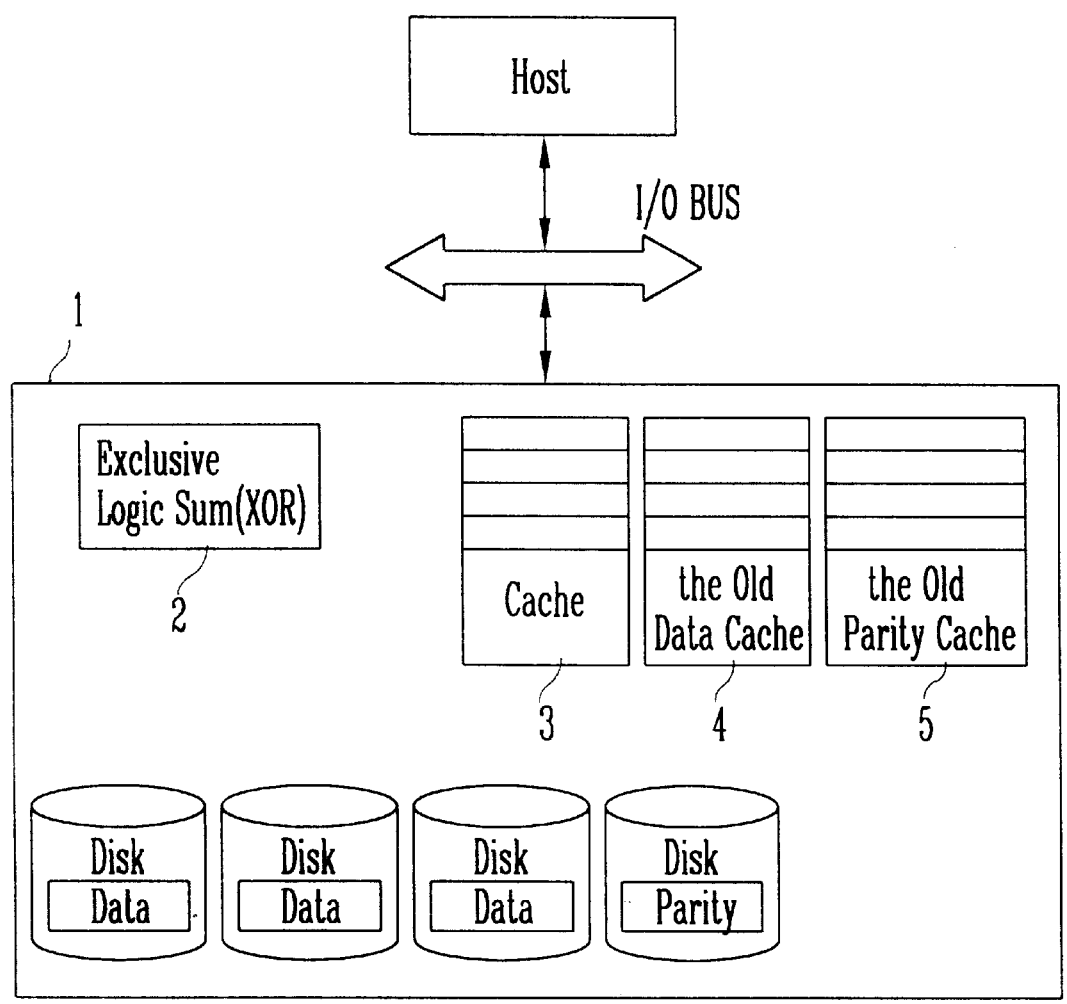
FIG. 1 is a block diagram of the architecture of former disk array.
Figure 2:
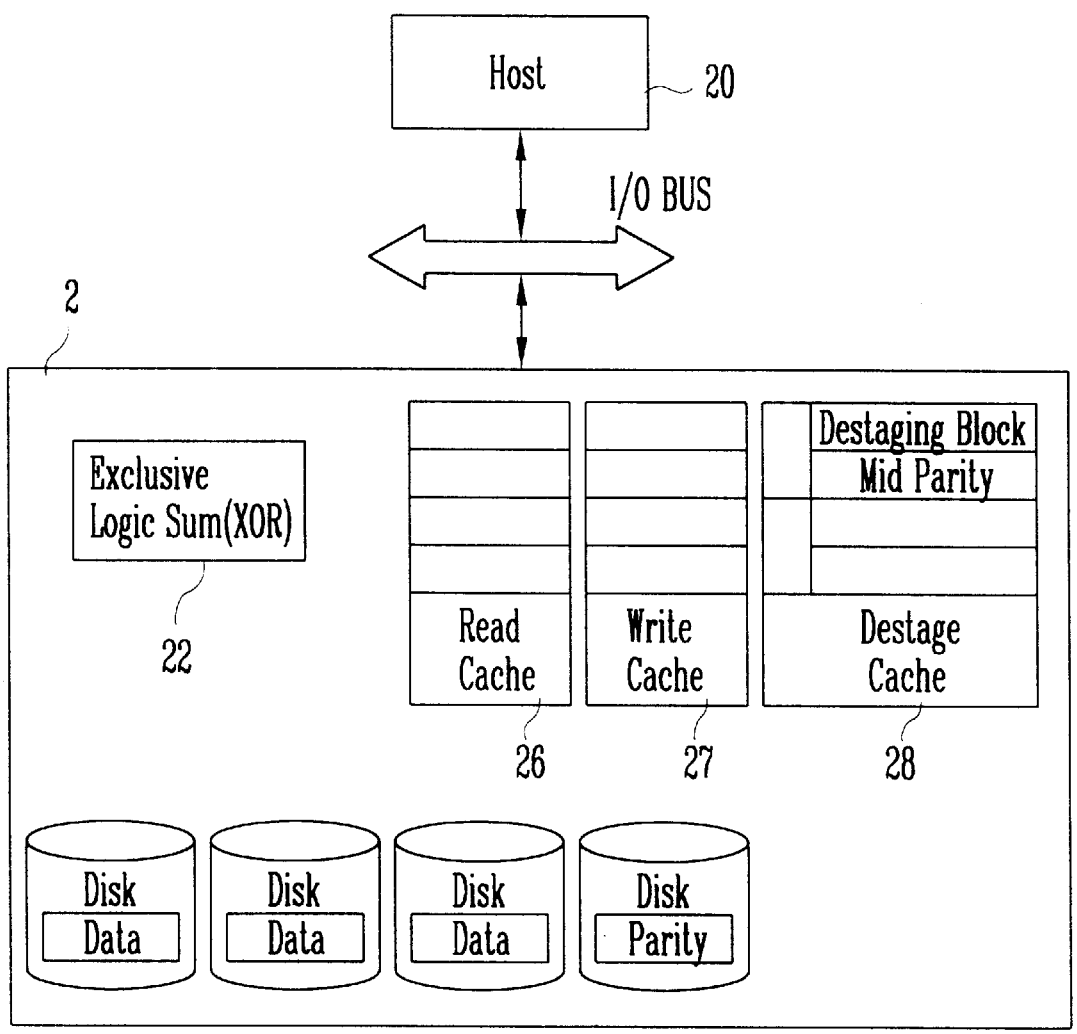
FIG. 2 is a block diagram of the architecture of disk array according to the present invention.

FIG. 2 is a block diagram of the architecture of disk array according to the present invention, which consists of the read cache 26, the write cache 27, the destaging cache 28, exclusive OR 22 and a plurality of disks. The purpose of involving the extra read cache 26 is to minimize the effect of delayed response occasioned from a write request on read response performance. Cache block of the destaging cache 28 consists of two blocks.

One is a destaging object transferred from the write cache 27, and the other is a storage of exclusive OR'ing result of the old data and the old parity on the block.

Figure 3:
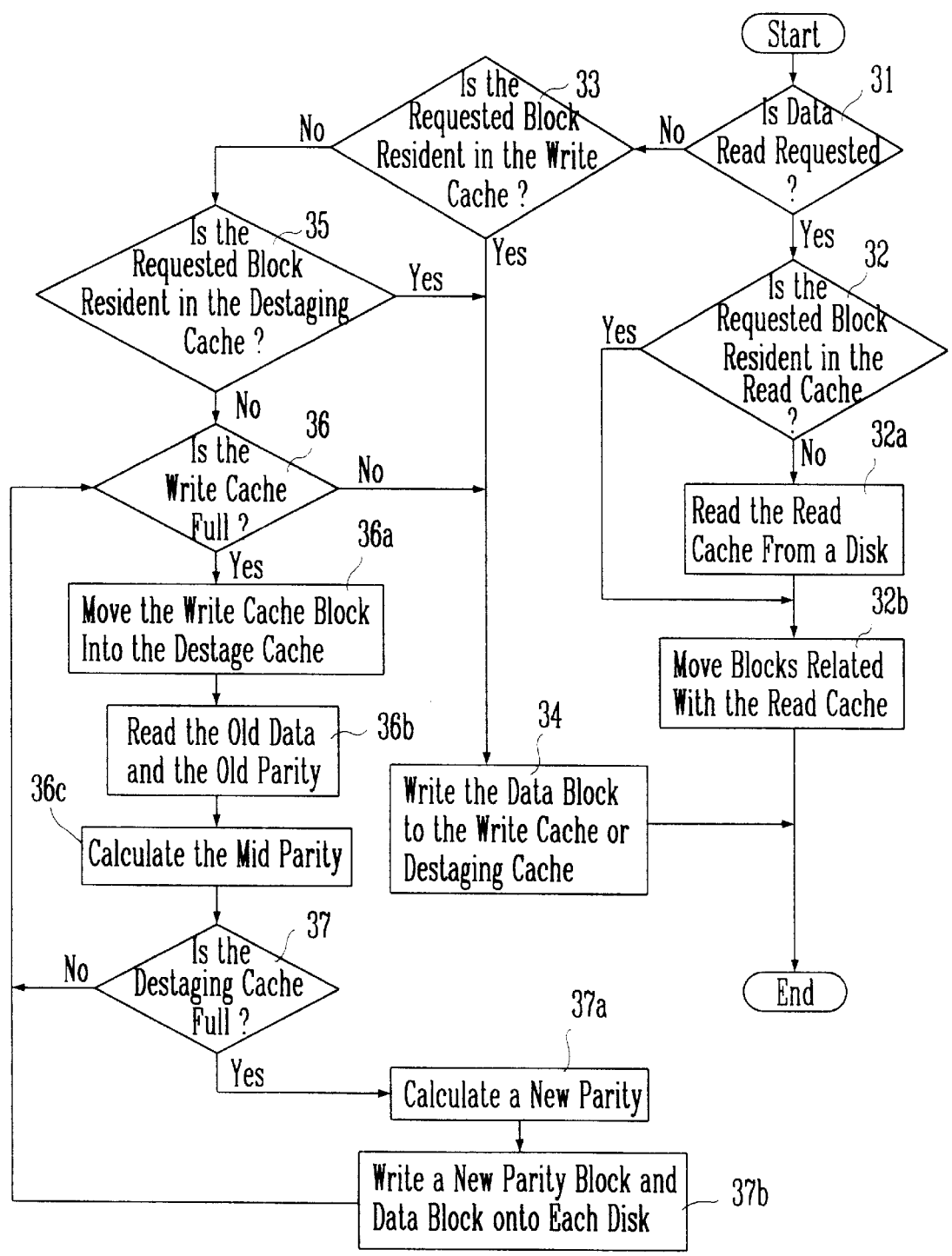
FIG. 3 is a flow diagram schematically illustrating transaction of an I/O request according to the present invention.

FIG. 3 is a flow diagram schematically illustrating transaction of an I/O request using three caches illustrated in FIG. 2, where the read cache is first inspected 32 after arrival of a read request from the host system 20, and if resident, the block is returned from the read cache, and if not, the block is read back into the read cache from disk and returned 32a. When a write request enters, the write cache and the destaging cache is first inspected 33, 35, and if resident in cache, the data transferred from the host are written onto the block. If not, the data transferred from the host are written onto the block, after inspecting whether or not there is any block available to allocate to the write cache 36. If no block available to allocate to the write cache, the block of the write cache is moved into the destaging cache 36a and the block of write cache is evacuated. The block which is moved into the destaging cache is an object of destaging, and therefore the old data and the old parity are read back 36b to get mid parity calculated as follows 36c;

$$\text{mid parity} = \text{old data} \oplus \text{old parity} \quad (1)$$

Destaging occurs when there is no room to allocate to the destaging cache. In this regard, one parity calculation 37a and two writes are processed. The new parity calculation is as follows;

$$\text{new parity} = \text{new data} \oplus \text{mid parity} \quad (2)$$

Figure 4:
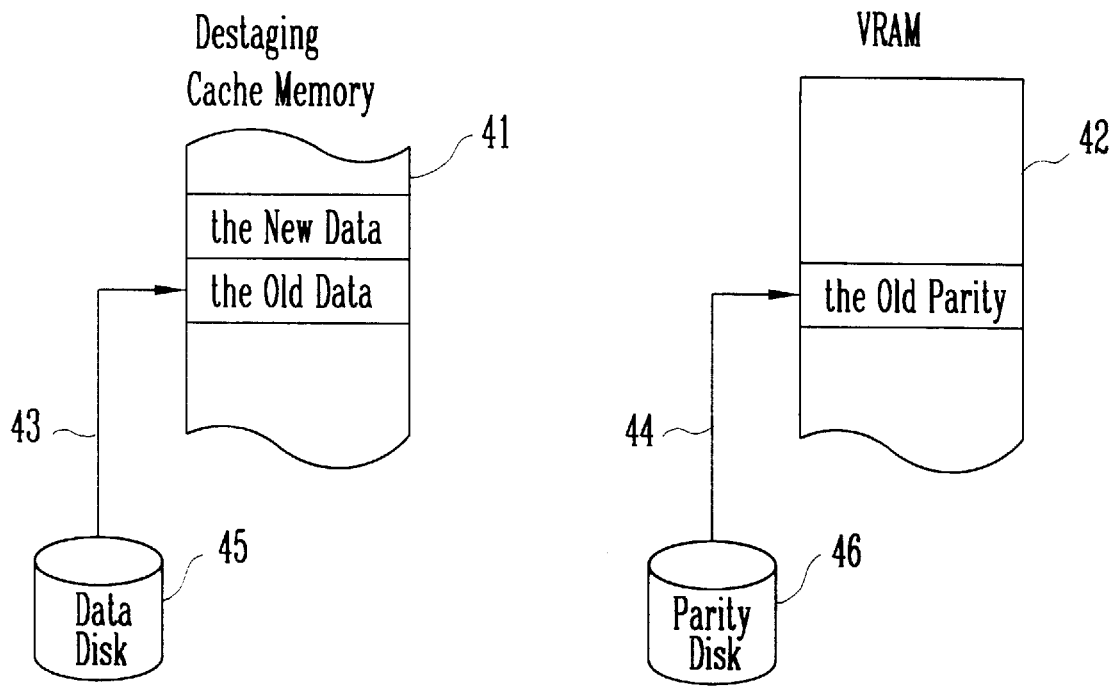
FIG. 4 is a diagram representing the procedure of reading back the old data and the old parity block from a disk with moving a write cache block into the destaging cache according to the present invention.

FIG. 4 is a diagram representing the procedure of reading back the old data and the old parity block from a disk with moving write cache blocks into the destaging cache, where the one that would be least recently used among cache blocks is moved to the destaging cache in case of full write cache.

Figure 5:
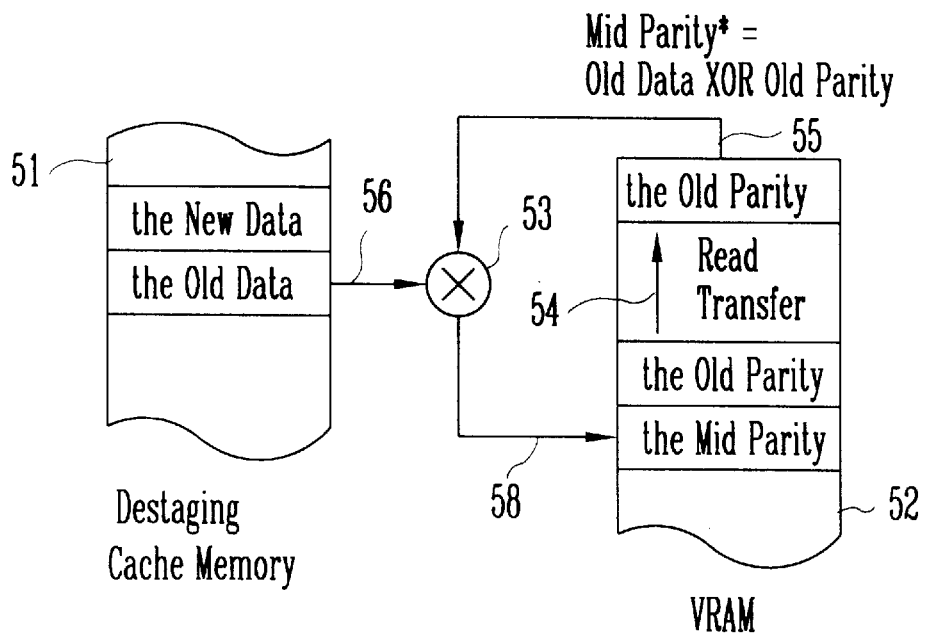
FIG. 5 is a diagram representing exclusive OR'ing of the old parity block and the old data previously read from destaging cache according to the present invention.

FIG. 5 is a diagram representing exclusive OR'ing of the old parity block and the old data previously read from the destaging cache.

Figure 6:
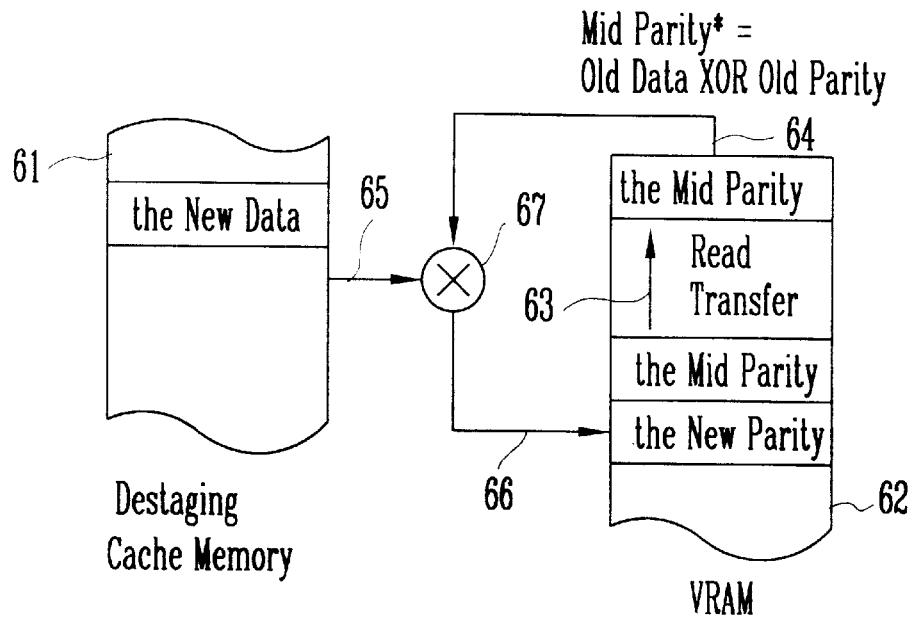
FIG. 6 is a diagram representing the procedure of obtaining a new parity for destaging according to the present invention.

FIG. 6 is a diagram representing the procedure of obtaining new parity for destaging.

Figure 7:
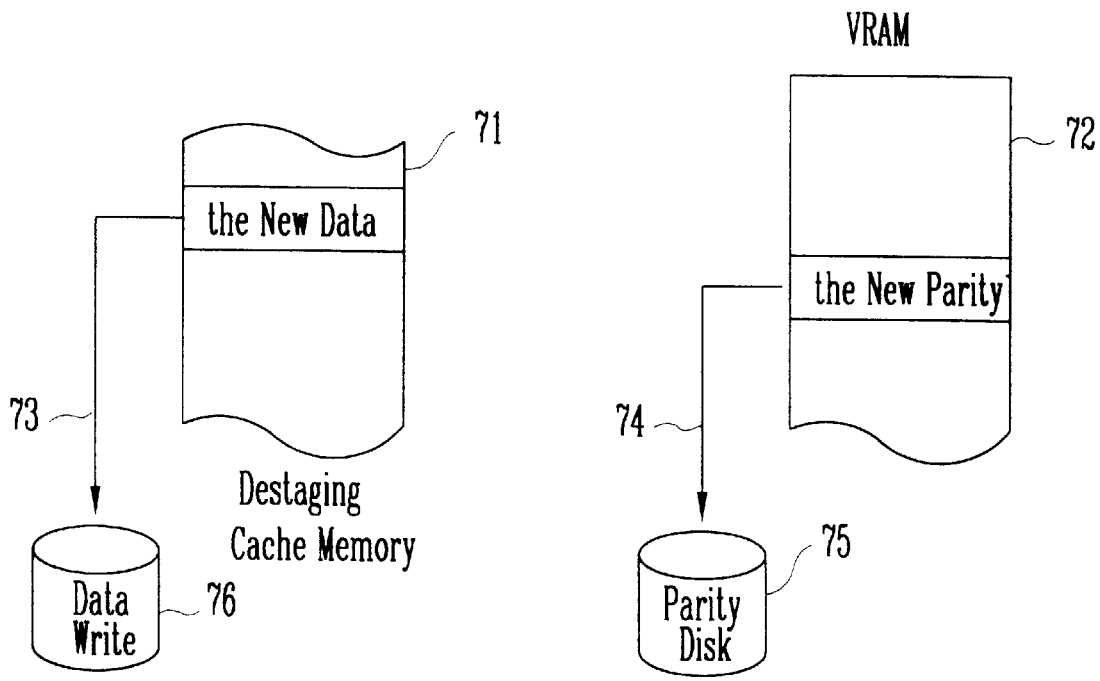
FIG. 7 is a diagram representing the procedure of writing an updated data from the last step of destaging and a new parity block into each data disk and parity disk according to the present invention.

FIG. 7 is a diagram representing the procedure of writing an updated data from the last step of destaging and a new parity block into each data disk and parity disk.

Referring to FIG. 4 to FIG. 7, parity calculation performs the operation of XOR'ing the old parity resident in VRAM and the old data resident in a disk cache memory and the operation of restoring it onto the parity cache. For the operations, concurrently Read Transfer operation 54, 63 is requested through VRAM controller and the output of XOR logic buffer is enabled.

Read Transfer operation is a prior operation 55 for reading data through SAM port of VRAM, and thereafter the data of continuously augmented addresses can be read by adding a clock signal to SC(Serial Clock) port of VRAM.

When Read Transfer operation terminates, the first word of a old data block of the disk cache memory is read 56, 65 and written onto RAM port of VRAM, where the write data into VRAM 66, 58 are resulting from XOR'ing the data read from the disk cache memory and the data read from SAM port of VRAM.

When the operation of reading from the disk cache memory and of writing onto VRAM terminates, the addresses of the disk cache memory and VRAM are augmented by a word, and the block size counter is diminished by a word. Further, the data of one-word augmented address are read by supplying a clock signal to SC port of VRAM. Writing the augmented address from the disk cache memory onto RAM port of VRAM is continued to operate till the block size counter reaches '0', from which the new parity block is XOR'ed with a new data block of the disk cache memory and updated by the XOR'ed value.

As illustrated, in the present invention the write cache is processed as being divided into the write cache and the destaging cache. The destaging cache, which has just one more block for mid parity to its data block, uses less memory and enables the write cache to be allocated with more blocks, and thereby it can improve hit ratio of cache. Here, the mid parity is XOR'ing of the old data block and the old parity block. Also in destaging, block parity calculation can increase its speed and relieve the processor burden by using a VRAM based parity engine which has dual ports.

The foregoing description, although described in its preferred embodiment with a certain degree of particularity, is only illustrative of the principles of the present invention. It is be understood that the present invention is not to be limited to preferred embodiments disclosed and illustrated herein. Accordingly, all expedient variations that may be made within the scope and spirit of the present invention are to be encompassed as further embodiments of the present invention.

What is claimed is:

1. A fast destaging method using a parity engine, comprising the steps of:

a. inspecting a read cache of a disk array after receiving a read request for a requested read block from a host system at the disk array;

b. returning the requested read block from the read cache if the requested read block is resident in the read cache and returning the requested read block from a disk after reading through the read cache if the requested read block is not resident in the read cache;

c. inspecting first a write cache and then a destaging cache of the disk array after receiving a write request for a requested write block from the host system at the disk array and writing the requested write block received from the host onto one of the write caches and the destaging cache if the requested write block is resident in the one of the write cache and the destaging cache;

d. determining whether there is an available block to allocate to the write cache if the requested write block is not resident in the one of the write cache and the destaging cache and routing the requested write block onto the available block if an available block is found;

e. moving a write cache block from the write cache to the destaging cache if no available block is found in said step d.;

f. reading an old data and an old parity of the write cache block and calculating a mid-parity therefrom;

g. determining whether the destaging cache is full after step f.;

h. writing the write request block to one of the write cache and the destaging cache if the destaging cache is determined not to be full in said step g.; and i. generating a destaging by calculating a new parity from the mid-parity and a new data, writing a new parity block and a new data block onto each data disk and parity disk of said disk array, and writing the write request block to the write cache if the destaging cache is determined to be full in said step g.

2. The fast destaging method of claim 1, wherein said step of calculating a mid parity comprises performing an exclusive OR operation on the old data and the old parity of the write cache block.

3. The fast destaging method of claim 1, wherein said step of calculating the new parity comprises performing an exclusive OR operation on the new data and the mid parity.

* * * * *